United States Patent Office
3,303,144
Patented Feb. 7, 1967

3,303,144
RESINOUS REACTION PRODUCT OF A DIGLYCI-
DYL ETHER AND AN AZIRIDINE COMPOUND
Greene W. Strother, Jr., Lake Jackson, Tex., assignor to
The Dow Chemical Company, Midland, Mich., a cor-
poration of Delaware
No Drawing. Filed Sept. 9, 1963, Ser. No. 307,301
13 Claims. (Cl. 260—2)

This invention relates to a new epoxy resin and a method for its preparation. More precisely, the invention concerns a resin produced by reacting a diepoxide with an N-(2-hydroxy alkyl) aziridine. These resins are clear to light colored and are useful as coating materials, potting resins, adhesives, paper coatings, and in laminating filaments or fabrics.

I have found that a diepoxide such as a diglycidyl ether will react with N-(2-hydroxy alkyl) aziridine at an elevated temperature to produce a useful resin. The alkyl aziridine which may be used in practicing this invention may be described according to the general formula:

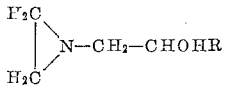

wherein R is H, or an alkyl group containing one or two carbon atoms. Diglycidyl ethers which are suitable for preparing these resins include the ethers of bisphenol A as well as the polydiglycidyl ether of bisphenol A containing recurring bisphenol A-glycidyl ether groups wherein the polyether contains up to an average of two bisphenol A groups. Other diglycidyl ethers which may be used are those of bisphenol F, 4,4'-dihydroxy diphenyl and dihydroxyl diphenyl sulfone as well as halogenated derivatives such as the tetrabromobisphenols. Ethers which do not contain an aromatic nucleus may also be used. Illustrative of these are diglycidyl ether and the diglycidyl ethers of polyhydric alcohols such as ethylene glycol, propylene glycol, glycerine, polyethylene glycol and polypropylene glycol. These aliphatic diepoxy ethers may be prepared by reacting epichlorohydrin with the appropriate polyhydric compound. These aliphatic ethers generally produce resins which are softer and more flexible than those prepared from diepoxy compounds having an aromatic nucleus in their molecular structure.

The high activity level of the aziridinyl group makes it possible to cure the resins rapidly without separate curing agents simply by heating the reaction mixture to about 50–200° C. and maintaining that temperature for about 0.5–20 hours, depending upon the particular reactants and the temperature. The resins can be cured at room temperature with somewhat longer cure times.

The proportion of the reactants may be varied, however the resins usually have the best properties when stoichiometric quantities are used, i.e., the equivalent ratio of aziridine to epoxide group is approximately 1:1. Thus, two moles of aziridine will combine with one mole of the diepoxide. Resins containing these components in a ratio from about 0.25:1 to about 2:1 may be suitable for some uses, however the highest tensile strength and lowest percent elongation is obtained when the ratio is near 1:1.

The aziridine and diepoxide are combined in the desired proportion at room temperature then heated to the curing temperature to produce cross-linking. Laminates may be prepared by impregnating the fibers with the reaction mixtures at room temperature then heating to effect the cure. Potting would be accomplished in a similar manner by applying the mixture of reactants at room temperature then heating to accelerate the rate of cure.

The following examples illustrate the manner in which these novel resins can be prepared and the properties of the resins produced.

Example 1

A 1:1 molecular equivalent mixture was prepared by mixing 10 parts by weight of N-(2-hydroxy ethyl) aziridine with 21.5 parts by weight diglycidyl ether of bisphenol A containing an average of 1.15 bisphenol-glycidyl ether groups per molecule. After curing at 50° C. for four hours, a practically colorless product was obtained which had a tensile strength of 7250 pounds per square inch, a heat distortion temperature of 142° F., and an Izod impact strength of 0.48 foot-pounds per inch of notch.

Example 2

A slightly colored and quite flexible resin was produced by curing 10 parts N-(2-hydroxy propyl) aziridine with 18.5 parts diglycidyl ether of bisphenol A of the type used in Example 1. After curing for four hours at 100° C. the product resin was found to have a tensile strength of 4450 pounds per square inch with an elongation of 31 percent and an Izod impact strength of .65 foot-pound per inch of notch.

Example 3

5.5 parts of N-(2-hydroxy ethyl) aziridine were mixed with 18.13 parts by weight of the diglycidyl ether of glycerine and cured at 68° C. for 12 minutes then at 150° C. for 30 minutes. A tough, flexible resin was produced.

Example 4

100 parts of N-(2-hydroxy ethyl) aziridine were mixed with 56 parts by weight of diglycidyl ether and cured at ambient temperature for 30 minutes to produce a flexible resin.

Example 5

39 parts by weight of N-(2-hydroxy ethyl) azirdine were mixed with 56 parts of diglycidyl ether of dipropylene glycol and cured overnight at ambient temperature then for one hour at 150° C. This produced a resin which was soft and flexible.

Example 6

4.14 parts of N-(2-hydroxy ethyl) aziridine were mixed with 15.1 parts of the diglycidyl ether of a polypropylene oxide having an average molecular weight of 400. The mixture was cured at 140° C. for 35 minutes then at room temperature (68° F.) for 17 hours. The resulting resin was soft and flexible.

The value of these resins as potting materials for electrical components is exemplified by their low water absorption characteristics. A resin of the type produced in Example 1 was immersed in water at ambient temperature and the amount of absorption determined by measuring the increase in weight with time. After 10 days the increase was 1.8 percent, and only 3.1 percent after 30 days immersion.

A glass cloth laminate prepared from a resin of the type produced in Example 1 was cured at 50 pounds per square inch for four hours at room temperature then post-cured at 150° C. for one hour with no pressure. This laminate had a flexural strength of 79,900 p.s.i., an Izod impact value of 27.2 foot-pounds per inch of notch and a Barcol hardness of 76.

I claim:
1. A thermoset resin produced by the reaction of a diglycidyl ether with an N-(2-hydroxy alkyl) aziridine wherein the alkyl group of said aziridine contains from 2 to 4 carbon atoms.
2. A resin according to claim 1 wherein said diglycidyl ether is a polydiglycidyl ether of a bisphenol containing an average number of bisphenol groups per molecule between 1 and 2.

3. A resin according to claim 1 wherein said diglycidyl ether is the diglycidyl ether of a polyhydric alcohol.

4. A resin according to claim 1 wherein said diglycidyl ether is a diglycidyl ether of glycerine.

5. A resin according to claim 1 wherein said aziridine is N-(2-hydroxy propyl) aziridine.

6. A resin according to claim 1 wherein said aziridine is N-(2-hydroxy propyl) aziridine.

7. A resin according to claim 1 wherein the equivalent ratio of aziridine to diglycidyl ether is at least 0.25:1 and no more than 2:1.

8. The process for producing a thermoset resin comprising:
   mixing a diglycidyl ether with an N-(2-hydroxyalkyl) aziridine in an equivalent ratio of aziridine to diglycidyl ether between about 0.25:1 and about 2:1, then heating said mixture to effect cross-linking and curing thereof.

9. The process according to claim 8 wherein the alkyl group in said aziridine contains at least two and not more than four carbon atoms.

10. The process according to claim 8 wherein said diglycidyl ether is the diglycidyl ether of bis(4-hydroxyphenyl)dimethylmethane.

11. The process according to claim 8 wherein said diglycidyl ether is the diglycidyl ether of a polyhydric alcohol.

12. A thermoset resin produced by mixing approximately equivalent amounts of an N-(2-hydroxy alkyl) aziridine with a diglycidyl ether then heating said mixture to effect cross-linking and curing thereof.

13. A thermoset resin produced by the reaction of about two molecular equivalents of N-(2-hydroxy ethyl) aziridine with one molecular equivalent of the diglycidyl ether of bis(4-hydroxyphenyl)dimethylmethane.

References Cited by the Examiner
UNITED STATES PATENTS

| | | | |
|---|---|---|---|
| 2,475,068 | 7/1949 | Wilson | 260—2 |
| 2,901,443 | 8/1959 | Stark et al. | 260—47 |
| 3,171,826 | 3/1965 | Pepis et al. | 260—47 |

WILLIAM H. SHORT, *Primary Examiner.*

T. D. KERWIN, *Assistant Examiner.*

UNITED STATES PATENT OFFICE

CERTIFICATE OF CORRECTION

Patent No. 3,303,144                              February 7, 1967

Greene W. Strother, Jr.

It is hereby certified that error appears in the above numbered patent requiring correction and that the said Letters Patent should read as corrected below.

Column 3, line 9, for "propyl" read -- ethyl --.

Signed and sealed this 17th day of October 1967.

(SEAL)
Attest:

Edward M. Fletcher, Jr.                          EDWARD J. BRENNER
Attesting Officer                                  Commissioner of Patents